United States Patent Office 3,746,663
Patented July 17, 1973

3,746,663
PROCESS FOR PREPARATION OF A POLYURETHANE FOAM USING A POLYMERIC LIQUID FOAM STABILIZER
John H. Beale, Wallingford, and Felix P. Carroll, Chester, Pa., assignors to Air Products and Chemicals, Inc., Wayne, Pa.
No Drawing. Filed Sept. 13, 1971, Ser. No. 180,183
Int. Cl. C08g 22/44
U.S. Cl. 260—2.5 AG                5 Claims

ABSTRACT OF THE DISCLOSURE

A cell stabilizer composition, particularly effective in high rise polyurethane rigid and semi-rigid foam bodies, is an effective amount of the entire liquid reaction product obtained from the polymerization of a monomeric system consisting of or comprising N-vinyl pyrrolidone in a polyol polymerization medium. The polymerizable monomeric system is selected from the group consisting of N-vinyl pyrrolidone; N-vinyl pyrrolidone-dibutyl maleate; and N-vinyl pyrrolidone-dibutyl maleate-vinyl acetate. The polyol employed as the polymerization medium is the reaction product of the alkylene oxide treatment of polyhydric alcohols having 2 to 8 hydroxyl groups. A polymerization initiator is employed.

BACKGROUND OF THE INVENTION

(1) Field of the invention

This invention concerns cell stabilizer compositions effective in the stabilization of polyurethane foam bodies prepared from formulations particularly conducive to high rise characteristics. These foam bodies are of the rigid and semi-rigid type such as poured-in-place insulation for refrigerators, freight cars or the like and for crash pads or similar uses.

(2) Prior art

A patent to Erner, U.S. 3,270,032, describes a stabilizer oil which is a terpolymer obtained by the exhaustive catalytic copolymerization of N-vinyl pyrrolidone, dibutyl maleate and vinyl acetate. Such terpolymer is polymerized in the presence of a chain transfer agent which may be a mercaptan or long chain monohydric alcohol and the terpolymer per se is the material recovered and used as the stabilizer oil. The terpolymer of Erner has a degree of effectiveness in the stabilization of foamed polymers.

The present invention provides compositions exhibiting marked improvement in effectiveness rivalling or surpassing the various silicone stabilizers highly regarded in the art, as well as showing substantial improvement in effectiveness over the terpolymer described by Erner. A further desirable feature resides in the substantially reduced cost factor over presently available stabilizers with generally equivalent effectiveness.

Other art of related nature but of less pertinency included U.S. 3,222,329, to Grosser et al; U.S. 3,223,687 to Crow; U.S. 3,376,236 to Erner; and U.S. 3,423,367 to Clark et al.

SUMMARY OF THE INVENTION

This invention concerns cell stabilizing compositions effective in high rise rigid and semi-rigid foam systems. The stabilizing effect pertains to development of the fully foamed body from suitable precursor formulations during the period of generation of the foam in providing uniformity of the developed cell structure with appropriate cell wall character from the onset of the foaming reaction through the rise and set of the cured polymer. The precursor formulation generally comprises an isocyanate having at least two —NCO groups per molecule, a poly-ether polyol, a blowing agent and a catalyst. Stabilization of the foam along with other improvements defined hereinafter is obtained by including in such precursor formulation a cell stabilizer which is the total liquid product of the free radical initiated polymerization of the polymerizable monomeric system selected from the group consisting of N-vinyl pyrrolidone, N-vinyl pyrrolidone-dibutyl maleate, and N-vinyl pyrrolidone-dibutyl maleate and vinyl acetate, and the medium in which the polymerization is effected, said polymerization medium being chiefly the polyfunctional reaction product of the alkylene oxide treatment of a polyhydric alcohol and characterized as a poly-functional polyether polyol.

Thee polymerization of the monomeric system should be complete to the extent of at least 30% of the total of monomeric system originally present and preferably to at least 70% to ensure uniform and quality results. The polymerization medium, i.e. the polyether polyol, constitutes no less than 40% of the total reaction composition and may constitute as much as 95% of the total reaction composition. In the polymerizable monomeric system when N-vinyl pyrrolidone is the only monomer, it is present in the entire reaction system in an amount in the range of 5–60% in the polyol. When the monomeric system consists of N-vinyl pyrrolidone and dibutyl maleate, best results are obtained when the N-vinyl pyrrolidone is initially present in an amount in the range of 12.7 to 26.5% and the dibutyl maleate is initially present in an amount in the range of 14.5 to 38.4% respectively, of the total reaction system; and the total amount of both monomers does not exceed 40% of the total reaction system. When the polymerizable monomeric system consists of N-vinyl pyrrolidone-dibutyl maleate and vinyl acetate the monomers are present in the amounts, respectively, of 10–19%, 20–25% and 8–16%.

The polymerization medium, exclusive of additives such as initiator, chain transfer agent or the like, is a polyfunctional polyether polyol which is the reaction product of the alkylene oxide treatment of a polyhydric alcohol having 2 to 8 hydroxyl groups, such as glycerine, propylene glycol, sorbitol, sucrose, amino-sucrose, alpha-methyl glucoside, ethylene glycol, pentaerythritol, trimethylolpropane, and the like. Such polyolalkylene oxide adduct is further characterized in that the weight average molecular weight is in the range of about 500 to about 5000 provided, of course, that the final total product obtained with such adducts and containing the polymerization reaction products is fluid rather than solid. A preferred range with triols is a weight average molecular weight from about 1500 to about 4000.

The alkylene oxide may be ethylene, propylene, or butylene oxide or mixtures thereof. Propylene oxide is preferred and approximately equal results are obtained when the treatment is first with propylene oxide and then with ethylene oxide.

The free radical initiator may be any of the known free radical initiators, such as for example, the peroxide type such as benzoyl peroxide, or azo-bisisobutyronitrile; with the provision that such free radical initiators are effective at the polymerization conditions, preferably being effective at temperatures in the range of 80–140° C.

The polymerization conditions and procedures are within the skills currently available in the art and are selected to obtain the desired degree of polymerization, which includes control of chain length, viscosity and weight average molecular weight, such that in conjunction with the polymerization medium in which the polymerization is effected the total reaction product is in the form of a liquid as opposed to a glass or other non-fluid form. The means of effecting control of the product to ensure an acceptable liquid state may include the use of known chain transfer agents, such as mercaptan or halogenated hydrocarbons, inasmuch as such agents impart no particularly detrimental effect, when employed in normal amounts, on the quality of the product cell stabilizer.

The total polymerization reaction liquid product is employed in the polyurethane formulation in an amount in the range of 0.5 to 3.0 parts by weight per 100 parts by weight of the polyether polyol employed in the polyurethane precursor formulation.

It is therefore among the objects of this invention to provide a cell stabilizer for use in the preparation of rigid and semi-rigid polyurethane foams. It is a further object of this invention to provide a cell stabilizer for polyurethane foam bodies characterized as the high rise type. Another object of the invention is to provide a cell stabilizer for polyurethane bodies and having an economic advantage. Another object of this invention is to provide in liquid form a readily handleable, readily soluble and completely compatible cell stabilizer for incorporation in precursor formulations for high rise polyurethane formulations. These and other objects will be apparent from the detailed description and examples which follows. The examples and descriptions are of an illustrative and constructive nature within the scope of the invention.

DETAILED DESCRIPTION

Polymer compositions in their mother polymerization medium as prepared in accordance with this invention have been found readily obtained with a variety of monomeric starting materials and a relatively broad base of polyols. Such compositions are stable solutions having a shelf life of months. Likewise, the compositions are compatible with the foam system. Benefits include an ease of blendability into the components of the precursor formulation of rigid and semi-rigid polyurethane foams, particularly and preferably when blended into the polyol portion of such precursor formulation. Such cell stabilizer compositions can be readily prepared as moderately low viscosity fluids which have the added advantage of ready pumpability directly to the machine head for blending with the other components of the polyurethane precursor formulations.

The presence of up to 70% unpolymerized monomer originally present in the monomer-polyol polymerization system has no serious detrimental effect on the cell stabilizing quality of the total liquid product of such polymerization system; however, it is preferred to have a relatively high order of completion of the polymerization reaction such as to 70% or better in order to insure little or no effect on the life of the stabilized polyurethane foams. It has been found with respect to residual monomers in the mother polymerization medium that it is preferred to have the total liquid product from systems comprising dibutyl maleate contain at least an equivalent amount of N-vinylpyrrolidone monomer when compared to the amount of residual monomeric dibutyl maleate. As is well known, unreacted monomeric material may polymerize even after removal of the product material from the polymerization reaction zone. Such further polymerization can alter the physical characteristics such as for instance in causing solidification and thereby reduce the effective shelf life. It is thus within the purview of this invention to strip off most or any part of the unreacted remaining monomer and to have the thus stripped residue considered as the entire liquid reaction product provided the mother polyol polymerization medium and the polymeric product therein remain substantially intact.

While the active ingredient in such polymeric systems of the herein defined invention may be the polymeric material itself, it is to be noted that the polymer removed from the mother polyol polymerization medium, while exhibiting a moderate cell stabilizing effect, is less effective even when redissolved in polyol than when the total liquid product is employed. Separate tests have shown that most polyols themselves afford poor or no stabilization for the urethane foams as shown by extremely coarse structure and poor rise characteristics.

The following examples are illustrative of various aspects of the invention.

EXAMPLE 1

Into a twenty-liter round bottom flask, equipped with an air stirrer, heating mantle, thermometer well, addition funnel and nitrogen bleed, was added 6930 g. of a triol of approximately 3000 molecular weight (M.W.), being the propylene oxide adduct of glycerol and commercially available as Voranol CP-3000. The system was purged with nitrogen while nitrogen flushed N-vinyl pyrrolidone, 1705 g., and dibutyl maleate, 3120 g. containing 60 g. of azo-bisisobutyronitrile as polymerization initiator were placed in the addition funnel. The polyol was heated to 90° C. and the addition of the monomers and initiator was effected over a period of two horus. The temperature was allowed to rise to 110° C. after the first half-hour of reaction time and it ascended to 135° C. for the second hour of reaction. The reaction mixture was then cooled. The product was found to contain 2.3% of unreacted N-vinyl pyrrolidone and 1.0% of unpolymerized dibutyl maleate showing that 84% of the N-vinyl pyrrolidone and 96.5% of the dibutyl maleate comprised the copolymer. This is a product solids content of 40.5 weight percent. The viscosity, measured by Shirley-Farrente method at 80° F., of the product was 4010 centipoises. Quality tests on the product appear hereinafter in Table A. Results are good.

EXAMPLE 2

A copolymerization was conducted as in the case of Example 1 except that two addition funnels were used for the addition of monomers. Into the dibutyl maleate was placed benzoyl peroxide, 60 g., to determine the effect of a different polymerization initiator. The initial temperature of polymerization was 90° C. as before. After the first half-hour of polymerization the temperature was raised to about 117° C. and held there for the duration of the run. The product contained 2.7% N-vinyl pyrrolidone monomer and 4.4% of dibutyl maleate indicating that 81.4% of the N-vinyl pyrrolidone and 83.4% of the dibutyl maleate comprised the copolymer. The viscosity of the solution by Shirley-Farrente at 80° F. was 3160 centipoises. The initiator was shown to be effective. Quality tests on the product appear hereinafter in Table A. Results are good.

EXAMPLE 3

The polymeric composition of Example 2 was prepared in bulk, by polymerization reaction in the absence of polyol, at 90° to 140° C. The Shirley-Farrente viscosity at 80° F. of the product was 6060 centipoises. The absence of polyol in the polymerization step had a detrimental effffect on product quality as shown hereinafter in Table A.

EXAMPLE 4

A terpolymer was prepared starting with the monomeric system of N-vinyl pyrrolidone, 13 wt. percent, dibutyl maleate, 23.7 wt. percent and vinyl acetate, 10.4 wt. percent by polymerization in a commercially available polyol, Voranol CP-3000, by azo-bisisobutyronitrile initiation (1.24% based on monomers) at 95° to 110° C. by the procedure of Example 1. The solution viscosity by the Shirley-Farrente method of the total liquid product was 78 centipoises. Results shown in Table A below show the system comprising terpolymer is effective.

EXAMPLE 5

A terpolymer of the composition of Example 4 was prepared by adding to Voranol CP-3000 (6930 g.) in a twenty-two liter stirred reactor, dibutyl maleate, 3120 g., containing 60 g. of benzoyl peroxide, from one addition funnel. A combination of 1705 g. of N-vinyl pyrrolidone and 2400 g. of vinyl acetate was added from the second addition funnel. The reaction was begun at 90° C. and after the first half-hour the temperature was raised to 110° C. After the course of reaction had been terminated, the excess vinyl acetate was stripped off under vacuum. The Shirley-Farrente measurement at 80° F. viscosity of the total liquid product was 316 centipoises. Data shown in Table A below establish the fact that a different type of initiator is effective.

EXAMPLE 6

A copolymer of the monomeric system containing 14.5% N-vinyl pyrrolidone and 26.6% dibutyl maleate was prepared by initiation of polymerization with 1.24% azo-bisisobutyronitrile. Polymerization was conducted 90° and 110° C. for slightly over 2 hours in the polyol polymerization medium, a polyether triol having a molecular weight of 4700 and containing an excess of ethylene oxide capping, available as Voranol CP-4701. The solution viscosity by Shirley-Farrente measurement at 80° F. of the product was 210 centipoises. The test results, appearing in Table A below, demonstrate effective results are obtained with a different polyol. The utility of a broad range of polyols is demonstrated by the test results of Examples 7-10 as shown in Table A below.

EXAMPLE 7

A copolymer of the composition of Example 6 was prepared in Thanol 6500, a polyether triol of 6500 M.W. with an excess of ethylene oxide capping. The Shirley-Farrente, 80° F., solution viscosity was 397 centipoises.

EXAMPLE 8

A copolymer of the composition of Example 6 was prepared in polyol RQ-490, a sorbitol initiated polyol with an approximate hydroxyl number of 490. The Shirley-Farrente, 80° F., viscosity of the solution was found to be 187 centipoises.

EXAMPLE 9

A copolymer of the composition of Example 6 was prepared in polyol RS-450, a sucrose initiated octol reacted with propylene-oxide and having an hydroxyl number of about 450. The Shirley-Farrente, 80° F., viscosity of the solution was found to be 8722 centipoises.

EXAMPLE 10

A copolymer of the composition of Example 6 was prepared in polyol RN-490, a sucrose coinitiated amine-containing polyol having a functionality of approximately, 4.4 and an hydroxyl number of approximately 490. The Shirley-Farrente, 80° F., viscosity of the solution was found to be 616 centipoises.

EXAMPLE 11

A copolymer containing 14.5% N-vinyl pyrrolidone and 26.6% dibutyl maleate was prepared by initiation of polymerization with 1.25 wt. percent of azo-bisisobutyronitrile based on monomer. The polymerization was conducted between 90° and 111° C. using dipropylene glycol of approximately 134 molecular weight as the polymerization medium. Subsequent use of the product showed the quality of cell stabilization was less than acceptable on the basis of the arbitrarily selected criteria as shown in Table A below. The lack of quality is attributable to the low molecular weight of the polyol polymerization medium.

EXAMPLE 12

A homopolymerization of N-vinyl pyrrolidone (57 g.— 0.514 mole) was initiated by azo-bisisobutyronitrile, 2 g., in 231 gm. of Voranol CP-3000. The polymerization was conducted at 110° C. Monomer addition was regulated to one hour with reaction thereafter continued for an hour. The product was a white suspension of poly(N-vinyl pyrrolidone) in polyol. The data on the product, as tested and reported in Table A, show that the system employing N-vinyl pyrrolidone is effective.

EXAMPLE 13

A terpolymer was made according to the procedure of Example 5. The polyol used was CP-1500, a propylene oxide modified triol of approximately 1500 M.W. with 105-120 hydroxyl number. Vinyl acetate monomer, 38.7 g. was recovered from the product by vacuum stripping, giving a total liquid final composition of 24.1% dibutyl maleate, 13.2% N-vinyl pyrrolidone and 9% vinyl acetate polymerized in CP-1500. The Shirley-Farrente, 80° F., solution viscosity was 18,690 centipoises. Test data compared to those for the results obtained on the product from Example 5, both sets of data appearing in Table A below, show that the stabilizers may have a wide range of product viscosity.

EXAMPLES 14-17

Into a twenty-two liter flask equipped as in Example 1 was added Voranol CP-3000, 6930 g. N-vinyl pyrrolidone, 1705 g. (15.35 moles) was placed in one addition funnel and dibutyl maleate, 3120 g. (13.68 mole) was placed in the other. Initiator of the types shown in the following tabulation was dissolved into the dibutyl maleate and chain transfer agent, when used, was placed in the N-vinyl pyrrolidone. The table below contains the molar amounts of initiator and chain transfer agent, the final solution viscosity and the percentage of residual monomer in the total product. t-Butyl perbenzoate was added in the amount 0.107 mole in each example below in order to promote polymer formation. The monomers and initiator were added over a period of two hours and the reaction temperature was held at 85° to 95° C. The temperature was then raised to 140° C. for one hour for the final cure. The reactor was then cooled to room temperature and the liquid product used to stabilize the formation of cells during polyurethane formation.

Synthesis of dibutyl maleate-co-N-vinyl pyrrolidone copolymers using chain transfer agents

| | | Transfer agent | | Soln. viscosity, 80° F., Shirley-Farrente | Polyurethane rigid Foam [1] | | | |
|---|---|---|---|---|---|---|---|---|
| | Initiator | Identity | Mole percent amount | | Vertical height, in. | Flow lines | Density, p.c.f. | Cell structure |
| Example: | | | | | | | | |
| 14 | TBP [2] | None | | 3,238 | 23.5 | None | 2.28 | Uniform, good. |
| 15 | TBP [2] | DDM [3] | 0.247 | 1,472 | 23.0 | do | 2.36 | Do. |
| 16 | TBP [2] | DDM [3] | 0.493 | 861 | 25.0 | do | 2.20 | Do. |
| 17 | TBP [2] | CHBr₃ | 0.040 | 1,400 | 24.7 | do | 2.22 | Do. |
| Ex. 1 | ABBN [4] | None | | 4,101 | 23.5 | do | 1.78 | Uniform, good. |

[1] Standard rigid foam formulation as in Example 18, below.
[2] Tertiary butylperbenzoate.
[3] Dodecyl mercaptan.
[4] Azo-bisbutyronitrile.

EXAMPLE 18

An α-methyl glucoside propylene oxide polyether polyol of approximately 3000-4000 M.W. (CS-114) with an hydroxyl number of 60 and a viscosity of 625 centipoises at 25° C. and a pH of 5.7 was used as the polymerization medium using the following formula

|  | Gms. |
|---|---|
| α-Methyl glucoside propylene oxide polyether polyol | 231.0 |
| N-vinyl pyrrolidone | 57.0 |
| Dibutyl maleate | 104.0 |
| t-Butyl perbenzoate | 2.0 |

Polymerization was effected over a 2 hour period at about 110° C. with monomer addition completed over the first hour. The product had a Brookfield viscosity at 23° C. of 2150-2200 centipoises. The product was employed in a standard rigid foam formulation

|  | Parts by weight |
|---|---|
| Polyol (Voranol RN-490) | 100 |
| Blowing agent (Genetron 11 SBA) | 50.4 |
| Catalyst, triethylene diamine (Dabco R-8020) | 4.0 |
| Isocyanate (Mondur MR at 105 index) | 127.0 |
| Cell stabilizer (Ex. 18) | 1.5 |

The product foam had a vertical height rise of 25 inches, no flow lines and an excellent foam structure of more than 40 cells to the linear inch.

EXAMPLE 19

A semi-rigid foam formulation was prepared for test purposes. The formulation was employed with several cell stabilizer additives as indicated below.

Semi-rigid formulation

| Polyol: | Parts by weight |
|---|---|
| (CP-4701) | 95.0 |
| (Quadrol) | 5.0 |
| Catalyst: a salt of triethylene-diamine (Dabco WT) | 1.0 |
| Isocyanate (Mondur MR 105 index) | 63.4 |
| Cell stabilizer as shown | 1.0 |

| Cell stabilizer | Cream | Rise | Shrinkage | Density, #/ft.³ | Air flow | Cells per inch | Tear strength |
|---|---|---|---|---|---|---|---|
| None | 10 | 84 | Slight | 2.54 | 2.23 | 36 | 0.94 |
| Product of Example 3 | 10 | 83 | None | 2.14 | 3.29 | 36 | 0.83 |
| Paraffin process oil | 10 | 84 | Moderate | 2.23 | 2.26 | 36 | 0.86 |
| Silicone (DC-190) | 10 | 87 |  | Collapse |  |  |  |

The data show in this instance that the highly considered silicone surfactant is too effective and that the product of Example 3 shows improved lower density and open cell structure, both desirable features in semi-rigid foams; and the absence of shrinkage as a definite improvement over the process art.

Cell stabilizer evaluation in rigid foam

An L-shaped mold with a (1½ inch thick) cross section is used to induce drag or shear on the foam system. The efficiency of the surfactant is measured by the height of the foam panel. The surfactant function is to maintain cell integrity and prevent blowing agent, e.g., Fluorocarbon 11, loss in a slowly gelling foam system thus effecting the height of the panel. The vertical section of the L-shaped molds especially the uppermost portion is used for measuring cell size and cell uniformity. The surfactant effects on cell uniformity are measured by shrinkage of cold aged test panels. Foam ingredients containing the surfactants of this invention (see table) were poured into a series of L-shaped molds, each mold having a 10¼ inch by 16½ inch base and a 16½ inch by 3½ inch vertical leg, the open portion within both base and leg being 1½ inches in thickness. At the forward part of the mold is a 14½ inch by 2 inch opening covered by a hinged flap where the foam ingredients were poured.

The ingredients were mixed at 1800 r.p.m. for a period of 15 seconds and then poured into the mold for a period of 5 seconds, the flap immediately closed and clamped and the foam allowed to rise and cure for about 10 minutes before removing.

The pint cups containing the excess foam were weighed after pouring to ensure that all molds contained approximately equal quantities (652± grams).

In the L-shaped mold, the foam must travel horizontally along the base of the mold; around a 90° corner and then travel vertically. The narrowness of the mold and the cornering place shearing effects on the rising foam which simulates cast-in-place use conditions. After the foam had cured, it was removed from the mold and cut vertically 2 inches from each side. First the height to which the foam rose was measured at 3½ inches above the base and the foams were cut horizontally. At this point maximum flow lines (striations) are observed and are rated. The cell size and percent open cells are measured. The criteria required in demonstration of acceptable quality included a vertical rise in the L-shaped mold of at least 21 inches, the substantial absence of flow lines, a K-factor of less than 0.17, and a uniformity of cell size and distribution of about 40 cells to the linear inch.

The following formulation was used in the evaluation of the different polymer additives in hand-mix foams.

| Formulation: | Parts by weight |
|---|---|
| Voranol RN-490 | 100.0 |
| Genetron 11 SBA | 50.4 |
| DABCO R-8020 | 4.0 |
| Premix | 154.4 |
| Surfactant (varied) | 1.5 |
| Mondur MR at 105 index | 127.0 |
| Mold charge _____grams | 562±4 |
| Free blown density _____lbs./ft.³ | 1.6 |

In Table A, following, the test results on the materials prepared in Examples 1-13 are presented.

TABLE A

Evaluation of non-silicone and silicone surfactants for flowability of bench-mixed rigid foam by "L" shaped molds (3,000 M.W. polyol)

| Surfactant of Example | Percent by weight | | | Viscosity, S.F. at 80° F. | Vertical height, in. | Flow lines | Density, p.c.f. | K factor | Percent open cells | Cells per in. | −20° F-1 day dimensional stability test |
|---|---|---|---|---|---|---|---|---|---|---|---|
|  | DBM | N-VP | VAC |  |  |  |  |  |  |  |  |
| 1 | 26.6 | 14.5 |  | 4,010 | 23.5 | None | 1.78 | 0.166 | 10.84 | 51 | Δ 0.0 |
| 2 | 26.6 | 14.5 |  | 3,160 | 23 | do | 1.77 | 0.157 | 10.72 | 44 | 0.0 |
| 3 | 65.0 | 35 |  | 6,070 | 21.5 | do | 1.74 | 0.168 | 12.75 | Coarse |  |
| 4 | 23.7 | 13.0 | 10.4 | 78 | 24.00 | do | 1.71 | 0.160 | 9.79 | 44 |  |
| 5 | 23.7 | 13.0 | 10.4 | 316 | 23.0 | do | 1.76 | 0.170 | 11.75 | 40 | 0.0 |
| 6 | 26.6 | 14.5 |  | 210 | 23.5 | None to few | 1.77 | 0.174 | 12.6 | 47 | 0.0 |
| 7 | 26.6 | 14.5 |  | 397 | 24.0 | do | 1.78 | 0.173 | 11.9 | 47 | 0.0 |
| 8 | 26.6 | 14.5 |  | 187 | 23.0 | None | 1.70 | 0.177 | 15.0 | 45 |  |
| 9 | 26.6 | 14.5 |  | 8,722 | 22.5 | do | 1.73 | 0.173 | 14.1 | 40 |  |
| 10 | 26.6 | 14.5 |  | 616 | 22.5 | do | 1.62 | 0.178 | 14.8 | 40 |  |
| 11 | 26.6 | 14.5 |  | 210 | 21.5 | Few | 1.79 |  | 13.7 | 36.3 | 0.0 |
| 12 |  | 25.0 |  | 635 | 23 | None | 1.89 |  | 12.7 | 43.6 | 0.0 |
| 13 | 23.7 | 13.0 | 10.4 | 18,690 | 21.0 | do | 1.83 |  | 13.4 | 40 | 0.0 |
| Control | DC-193 silicone | | | ¹465 | 24.0 | do | 1.68 | 0.157 | 9.27 0 | 40 | Δ 0.6 |

¹Absolute.

Obviously, many modifications and variations of the present invention as hereinbefore set forth may be made without departing from the spirit and scope thereof and therefore only such limitations should be imposed as are indicated in the appended claims.

What is claimed is:

1. In the method of preparing polyurethane foam from a precursor formulation comprising an isocyanate having at least two —NCO groups per molecule, a polyether polyol, a catalyst, and a blowing agent, the improvement comprising, adding as the sole effective cell stabilizer from 0.5 to 3 parts by weight per 100 parts by weight of the polyether polyol in said precursor formulation of total liquid product of the free radical-initiated polymerization of the polymerizable monomeric system selected from the group consisting of N-vinyl pyrrolidone, N-vinyl pyrrolidone and dibutyl maleate, and N-vinyl pyrrolidone, dibutyl maleate and vinyl acetate, said polymerization having been effected in a polymerization medium which is a polyfunctional polyether polyol.

2. The method in accordance with claim 1 wherein said polymerization medium is the polyfunctional reaction product of the alkylene oxide addition to a polyhydric alcohol having 2 to 8 hydroxyl groups such as glycerin, propylene glycol, sorbitol, sucrose, amino-sucrose, alpha-methyl glucoside, ethylene glycol, pentaerythritol and trimethylol propane.

3. The method in accordance with claim 1 wherein said alkylene oxide treated polyhydric alcohol component has a weight average molecular weight in the range of 150 to about 5000.

4. The method in accordance with claim 1 wherein said cell stabilizer is the liquid polymer-polyol product comprising the copolymer of N-vinyl pyrrolidone and dibutyl maleate polymerized in trifunctional polyol, and including the inactivated residue of said initiator and residual precursor monomers.

5. The method in accordance with claim 4 wherein said copolymer is comprised of at least 70% of the precursor monomers initially present.

References Cited

UNITED STATES PATENTS

| 3,304,273 | 2/1967 | Stamberger | 260—859 R |
| 3,383,351 | 5/1968 | Stamberger | 260—2.5 AD |
| 3,270,032 | 8/1966 | Erner | 260—2.5 AG |
| 3,376,236 | 4/1968 | Erner | 260—2.5 AG |
| 3,523,093 | 8/1970 | Stamberger | 260—2.5 AM |

OTHER REFERENCES

| 1,040,452 | 8/1966 | Great Britain | 260—2.5 BE |

DONALD E. CZAJA, Primary Examiner

C. W. IVY, Assistant Examiner

U.S. Cl. X.R.

260—2.5 AM; 2.5 AQ; 2.5 BE; 88.3 L; 326.3; 326.5

PO-1050
(5/69)

UNITED STATES PATENT OFFICE
CERTIFICATE OF CORRECTION

Patent No. 3,746,663          Dated July 17, 1973

Inventor(s) John H. Beale and Felix P. Carroll

It is certified that error appears in the above-identified patent and that said Letters Patent are hereby corrected as shown below:

Column 6, in the Table, in the line starting "Ex.1", under the column heading "Soln.viscosity,80°F., Shirley-Farrente" the numerical value of "4,101" should be --4010--.

Signed and sealed this 15th day of October 1974.

(SEAL)
Attest:

McCOY M. GIBSON JR.
Attesting Officer

C. MARSHALL DANN
Commissioner of Patents

UNITED STATES PATENT OFFICE
CERTIFICATE OF CORRECTION

Patent No. 3,746,663          Dated July 17, 1973

Inventor(s) John H. Beale and Felix P. Carroll

It is certified that error appears in the above-identified patent and that said Letters Patent are hereby corrected as shown below:

Column 7, between lines 38 and 39, a line should be present reading -- Water---3.0 parts by weight --.

Signed and sealed this 6th day of May 1975.

(SEAL)
Attest:

RUTH C. MASON
Attesting Officer

C. MARSHALL DANN
Commissioner of Patents
and Trademarks